United States Patent
Klein-Hitpass (10) Patent No.: US 10,371,250 B2
(45) Date of Patent: Aug. 6, 2019

(54) PLANETARY AXLE

(71) Applicant: SIEMENS AKTIENGESELLSCHAFT, München (DE)

(72) Inventor: Arno Klein-Hitpass, Aachen (DE)

(73) Assignee: Flender GmbH, Bocholt (DE)

( * ) Notice: Subject to any disclaimer, the term of this patent is extended or adjusted under 35 U.S.C. 154(b) by 53 days.

(21) Appl. No.: 15/680,913

(22) Filed: Aug. 18, 2017

(65) Prior Publication Data

US 2018/0051797 A1 Feb. 22, 2018

(30) Foreign Application Priority Data

Aug. 19, 2016 (EP) ..................... 16184864

(51) Int. Cl.
*F16H 57/08* (2006.01)
*F16H 1/28* (2006.01)

(52) U.S. Cl.
CPC ........... *F16H 57/08* (2013.01); *F16H 1/2836* (2013.01); *F16H 2057/085* (2013.01)

(58) Field of Classification Search
None
See application file for complete search history.

(56) References Cited

U.S. PATENT DOCUMENTS

| | | | |
|---|---|---|---|
| 2,095,794 A | 10/1937 | Corbin | |
| 3,381,548 A * | 5/1968 | Wolkenstein | F16H 1/2809 29/428 |
| 8,506,446 B2 * | 8/2013 | Minadeo | F16H 1/2836 475/346 |
| 8,591,368 B2 | 11/2013 | Dinter et al. | |
| 8,591,371 B2 | 11/2013 | Dinter et al. | |
| 8,621,940 B2 | 1/2014 | Klein-Hitpass et al. | |
| 8,632,437 B2 | 1/2014 | Dinter et al. | |
| 8,777,802 B2 * | 7/2014 | Erno | F16H 1/2836 475/346 |
| 8,784,252 B2 | 7/2014 | Dinter et al. | |
| 9,051,922 B2 | 6/2015 | Böing et al. | |
| 9,151,275 B2 | 10/2015 | Dinter et al. | |
| 9,267,864 B2 | 2/2016 | Klein-Hitpass et al. | |
| 2010/0197444 A1 * | 8/2010 | Montestruc | F16H 1/2836 475/331 |
| 2012/0028755 A1 * | 2/2012 | Erno | F03D 15/10 475/331 |
| 2015/0142175 A1 | 5/2015 | Reimers et al. | |
| 2015/0239076 A1 | 8/2015 | Klein-Hitpass et al. | |
| 2016/0229009 A1 | 8/2016 | Klein-Hitpass et al. | |

FOREIGN PATENT DOCUMENTS

| | | | |
|---|---|---|---|
| DE | 25 23 725 A1 | 12/1975 | |
| DE | 102011075906 A1 * | 11/2012 | ........... F16H 1/2836 |
| EP | 2 518 371 A1 | 10/2012 | |
| EP | 2 559 915 A1 | 2/2013 | |

* cited by examiner

*Primary Examiner* — Justin Holmes (74) *Attorney, Agent, or Firm* — Henry M. Feiereisen LLC (57) ABSTRACT

A planetary axle for a planetary gearbox can be constructed analogously to a transverse link axle and/or a thrust/flexural link axle and/or a longitudinal link axle for use in the automotive industry. The planetary axle includes a clamping area for clamping of the planetary axle in a side of a planetary carrier, a bearing seat area for receiving a planetary bearing, and a link area disposed between the clamping area and the bearing seat area.

7 Claims, 11 Drawing Sheets

PLANETARY AXLE

CROSS-REFERENCES TO RELATED APPLICATIONS

This application claims the priority of European Patent Application, Serial No. 16184864.3, filed Aug. 19, 2016, pursuant to 35 U.S.C. 119(a)-(d), the content of which is incorporated herein by reference in its entirety as if fully set forth herein.

BACKGROUND OF THE INVENTION

The invention relates to a planetary axle and to a planetary gearbox stage.

In planetary gearboxes planetary wheels supported rotatably on planetary axles mesh simultaneously with an internally toothed hollow wheel and with an externally toothed sun wheel. It is known to perform modifications to the planetary axles which improve their elastic resilience in order to be able to compensate for design and load-related misalignments of the planetary wheels relative to the hollow wheel and the sun wheel.

It would be desirable and advantageous to provide an improved planetary axle and a planetary gearbox stage to obviate other prior art shortcomings.

SUMMARY OF THE INVENTION

According to one aspect of the present invention, a planetary axle for a planetary gearbox can be constructed analogously to a transverse link axle and/or a thrust/flexural link axle and/or a longitudinal link axle for use in the automotive industry, with the planetary axle including a clamping area for clamping of the planetary axle in a side of a planetary carrier, a bearing seat area for receiving a planetary bearing, and a link area disposed between the clamping area and the bearing seat area.

The inventive planetary axle, which is also referred to below simply as axle, is suited for installation in a planetary gearbox stage.

The invention is based on the knowledge that the planetary wheel bearing on the planetary axle of a planetary gearbox is comparable to a wheel suspension in a motorcar. The chassis of the planetary axle and the street correspond to the planetary carrier. Where possible the chassis should also not change its position in the case of an uneven carriageway. The planetary axle of a planetary gearbox should likewise not change its position with respect to the hollow wheel and the sun wheel.

The present invention recognizes that knowledge about wheel suspensions in the automotive industry is applicable to a planetary axle. The following variants of the wheel suspension have proven suitable for an analogous application: transverse link axle, thrust/flexural link axle and longitudinal link axle.

Compared with other machine elements in the planetary gearbox, the planetary axle has relatively little stress so that geometric modifications can be performed on the planetary axle without exceeding the stress limits. For this purpose use is made of various elastically functioning mechanisms which compensate for unevennesses in the roadway and which result in a soft planetary wheel suspension.

With a double wishbone wheel suspension in the automotive industry two limbs (known as transverse links or transverse link arms) supported on the frame oscillate at right angles to the direction of travel (double rocker). The planetary carrier corresponds to the frame in the case of a planetary gearbox. Compared with the vehicle mechanism, the transverse links in the planetary axle are however not articulated but instead rigid; in this case they simultaneously take over the spring function which a separate spring damper element otherwise takes over. The links connect the clamping area and bearing seat area of the planetary axle. The rigidity and thus the type of system steering can be varied by varying the link lengths and cross-sections. The planetary axle has a variable shearing strength across the through openings running at right angles to the longitudinal axis. The link axle generates relative displacements of bearing seat areas by means of link elements.

The simple thrust/flexural link likewise compensates for rigidity differences in the peripheral direction. The inventive solution is characterized in that the planetary axle is notched between the clamping areas at least on one side so that a thrust/flexural link is produced. A clever choice of cross-section and length of the generated profile can control the deflection. This variant has advantages if as a result of a deformation of the planetary carrier sides a significant misalignment of the planetary axle bore holes is present. However this variant generates a bending moment in the axle holder.

The transfer of the longitudinal link axle mechanics known from the automotive industry onto the planetary suspension is characterized in that the centroidal axis of the link area is embodied eccentrically with respect to the centroidal axis of the bearing seat area and/or to the centroidal axis of the support/clamping area. By elastically twisting the link area, the planet can carry out circular path movements about the centroidal axis of the eccentric part. The radius of the circular path corresponds to the distance of the centroidal axis of the two parts.

Further advantageous features are set forth in the dependent claims, and may be combined with one another in any desired manner in order to achieve further advantages.

According to another advantageous feature of the present invention, when the planetary axle is embodied analogously to the transverse link axle, the link area can include at least one through opening which extends at a right angle to a central axis of the planetary axle, and at least two transverse link arms which connect the clamping area and the bearing seat area.

According to another advantageous feature of the present invention, when the planetary axle is embodied analogously to the thrust/flexural link axle, the link area can include a bar which extends radially from an axis of rotation of the planetary carrier and through a central axis of the planetary axle.

According to another advantageous feature of the present invention, when the planetary axle is embodied analogously to the longitudinal link axle, the link area can define a centroidal axis which extends eccentrically with respect to a centroidal axis of the bearing seat area and/or to a centroidal axis of the clamping area.

According to another aspect of the present invention, a planetary gearbox stage includes a planetary axle, the planetary axle being constructed analogously to a transverse link axle and/or a thrust/flexural link axle and/or a longitudinal link axle for use in the automotive industry, the planetary axle comprising a clamping area for clamping of the planetary axle in a side of a planetary carrier, a bearing seat area for receiving a planetary bearing, and a link area disposed between the clamping area and the bearing seat area.

According to another advantageous feature of the present invention, when the planetary axle is embodied analogously to the transverse link axle, the through opening can be aligned at a right angle to a circular path of the planetary axle.

According to another advantageous feature of the present invention, in the case of a planetary axle embodied analogously to the thrust/flexural link axle, the bar can define a plane which extends radially with respect to a sun wheel plane of the planetary gearbox stage.

According to another advantageous feature of the present invention, when the planetary axle is embodied analogously to the longitudinal link axle, the link area can define a centroidal axis which is eccentrically radially with respect to a sun wheel of the planetary gearbox stage.

The transverse links can have different lengths and cross-sections. The advantage here is that the spring rigidity of the transverse links can be adjusted.

The transfer of the links to the adjacent areas can be provided with radii or elliptical vertical curves. The advantage here is that no voltage peaks arise, or voltage peaks are reduced.

According to another advantageous feature of the present invention, the axle may be designed so that under load the axle itself generates guided/directional elastic translational and/or rotational displacements of the subareas in relation to one another. The advantage here is that desirable deflections of the axle can be deliberately adjusted in order to compensate for axial inclination and axial deviation errors.

According to another advantageous feature of the present invention, a spacer sleeve with as high a rigidity as possible may be interposed between the bearing seat of the axle and the bearings (roller or slide bearing) in order to widen the bearing seat area. The advantage here is that as a result longer transverse link arms are possible while retaining the same installation space in respect of conventional embodiments. An increased deflection can thus be achieved. A uniform distribution of force across the width of the bearing is achieved by a high rigidity.

According to another advantageous feature of the present invention, the axle may include one or a number of any uniform profiles. The advantage here is that these are simple to produce.

According to another advantageous feature of the present invention, a link mechanism may be produced in a material and/or form and/or force-fit manner. The advantage here is that the link mechanism can be composed of parts with different varying materials. Furthermore, a link mechanism combined from several elements is advantageous for the assembly.

According to another advantageous feature of the present invention, the axle may have at least one jump in the shearing strength path at right angles to the axle. This is a feature of the axle. The advantage here is that higher deformations compared with axles with constant shearing strength can be achieved in a smaller installation space. The reason for this is that shearing strength and flexural stiffness overlie one another and with short parts the shearing strength is dominant over the flexural stiffness.

According to another advantageous feature of the present invention, the outer dimensions (diameter) of the link area may be smaller than those of the clamping area or bearing seat area. The advantage here is that sleeves without shoulders can be used.

According to another advantageous feature of the present invention, the rigidity and deformation features of the axle can be adjusted by varying the link bar lengths and heights (link profile) and its position over the height of the axle. The advantage here is that on the one hand the nestling of the axle into the planetary axle bore hole and on the other hand the inclination of the axle relative to the planetary carrier can be adjusted. With a motor vehicle the camber is adjusted as a result.

According to another advantageous feature of the present invention, the planetary axle may be embodied as a simple thrust/flexural link. The advantage here is that the axle permits elastic, translational and rotational deflections between the clamping area and the bearing seat.

According to another advantageous feature of the present invention, the planetary axle may be embodied as a multiple thrust/flexural link. The advantage here is that at least two directional rigidity features can be embodied between the clamping point and bearing seat and axial inclination and axial deviation errors can thus be compensated.

According to another advantageous feature of the present invention, the support/clamping of the axle may be established on one side, on both sides or centrally. The advantage here is that the axle can be used in a planetary carrier with one side, in a conventional one with two sides or in one with a side centrally therein, similar to a bogie plate.

According to another advantageous feature of the present invention, the axle may be secured against twisting in the planetary carrier in a form and/or force-fit manner. The advantage here is that a twisting or axial wandering of the axle in the planetary carrier is avoided as a result.

According to another advantageous feature of the present invention, the axle of the bearing seat may be arranged eccentrically with respect to the centroidal axis of a cam profile. The advantage here is that opposite the clamping point the bearing seat can carry out an elastic swivel movement about the centroidal axis of the cam area.

According to another advantageous feature of the present invention, the axle may have spherical areas. The advantage here is that conical tight fits can be realized with counter parts likewise embodied to be conical.

According to another advantageous feature of the present invention, in the case of a planetary axle embodied analogously to a longitudinal link axle, the centroidal axis of the link area may be embodied eccentrically with respect to the central axis of the planetary axle. A plane spanned by the centroidal axis and central axis can be aligned arbitrarily, advantageously tangentially or perpendicular to the circular path of the planet.

BRIEF DESCRIPTION OF THE DRAWINGS

Other features and advantages of the present invention will be more readily apparent upon reading the following description of currently preferred exemplified embodiments of the invention with reference to the accompanying drawings, in which.

DETAILED DESCRIPTION OF PREFERRED EMBODIMENTS

Throughout the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
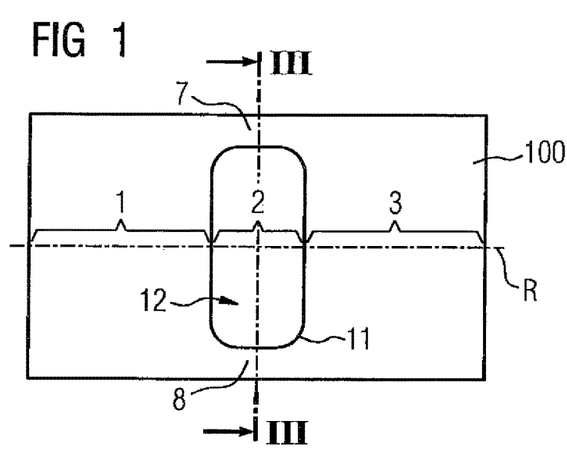
FIG. 1 shows a front view of a planetary axle clamped on one side with a double wishbone mechanism.
Figure 2:
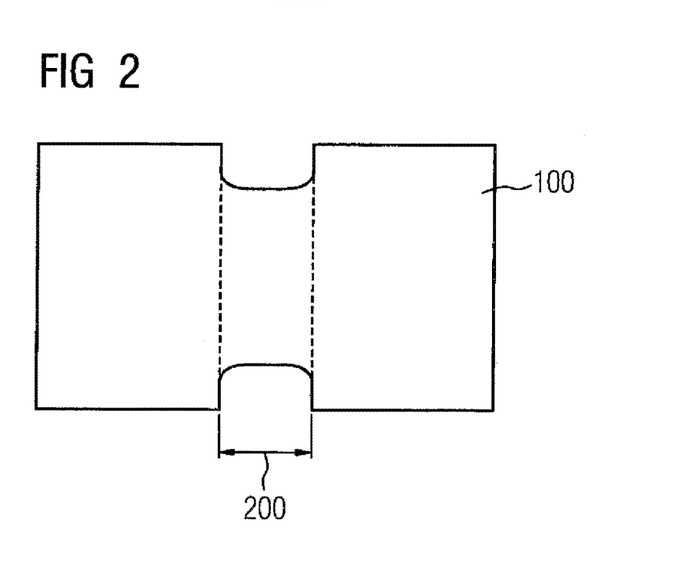
FIG. 2 shows a top view of the planetary axle of FIG. 1.
Figure 3:
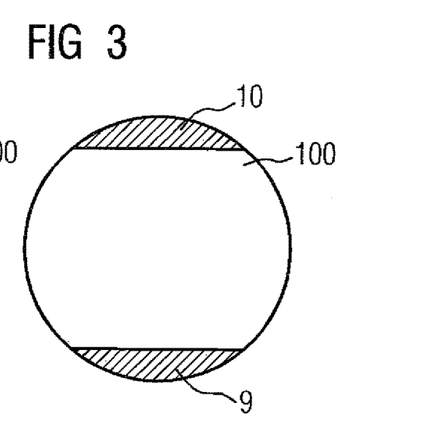
FIG. 3 shows a sectional view of the planetary axle, taken along the line III-III in FIG. 1.

FIGS. 1 to 3 show a planetary axle clamped on one side with a double wishbone mechanism. The planetary axle for supporting gear wheels is modified such that it has a relative jump in the shearing strength so that at least two subareas can be displaced elastically in parallel to one another. The principally creative solution consists here at least of a support/clamping area 1 for supporting or clamping the planetary axle in a planetary carrier, a link area 2 with a defined axial length 200 and a bearing seat area 3 with a bearing seat for supporting/receiving the bearing. The link area 2 has at least one through opening 12 with an arbitrary cross-section at right angles to the central axis R. The material of the planetary axle 100, which stops after producing the through opening 12 in the link area 2, forms at least two transverse link arms 7, 8 which connect the areas 1 and 3. The transverse link arms 7, 8 can have an arbitrary cross-section 9, 10.

A defined inclination of the axles of the area 1 in relation to area 3 can be generated or overlaid for parallel displacement by a non-uniform design of the link lengths.

The transfer of the links 7, 8 to the adjacent areas is advantageously provided with radii or elliptical vertical curves 11. The diameter of the link area 2 may be smaller than the diameter of the clamping area 1 or of the bearing seat area 3. This is necessary so that during deflection the links 7, 8 do not collide with an optional spacer sleeve.

Figures 4, 6:
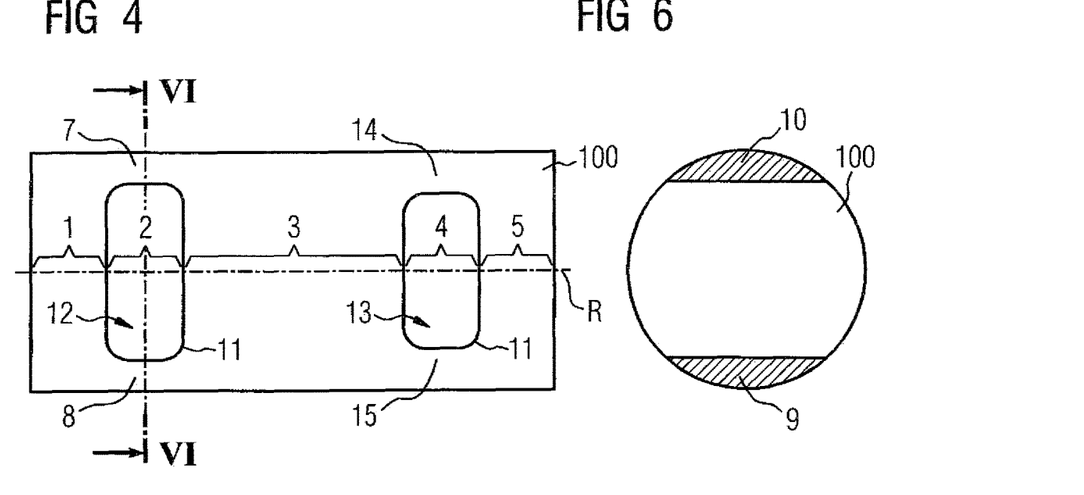
FIG. 4 shows a front view of a planetary axle clamped on two sides with a double wishbone mechanism.
FIG. 6 shows a sectional view of the planetary axle, taken along the line VI-VI in FIG. 4.
Figure 5:
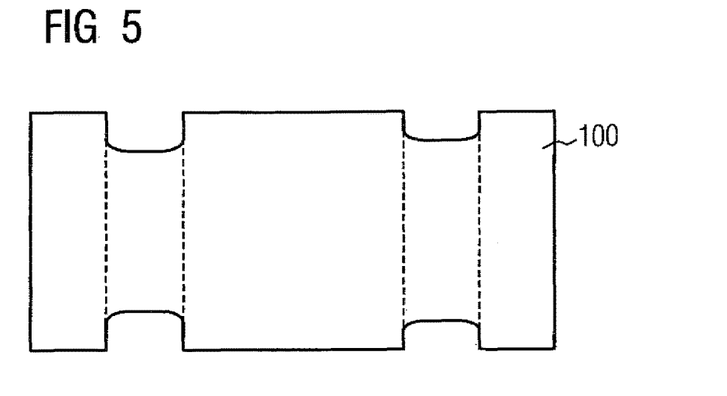
FIG. 5 shows a top view of the planetary axle of FIG. 4.

FIGS. 4 to 6 show a planetary axle clamped on two sides with a double wishbone mechanism. The axle for supporting gear wheels has a clamping area 1, 5 at both ends in each case for fixing in a two-sided frame, i.e. the two-sided planetary carrier, a central area 3 with the bearing seat and in each case a transverse link area 2, 4 between the clamping area 1, 5 and bearing seat. The transverse links 7, 8, 14, 15 are produced by introducing two through openings 12, 13 disposed at right angles to the central axis R. The transverse links 7, 8, 14, 15 allow an elastic parallel displacement of the central area 3 with respect to the two clamping areas 1, 5. The deflection of the axle areas 1, 3, 5 can be adjusted by varying the link cross-sections 9, 10. A defined displacement with a superimposed defined inclination of the central area 3 in relation to the areas 1 and 5 can be adjusted by means of a non-uniform design of the link lengths. The links 7, 8, 14, 15 can have different cross-sections and lengths. The transfer of the links 7, 8, 14, 15 to the adjacent areas 1, 3, 5 is advantageously provided with radii or elliptical vertical curves 11. The diameter of the link area 2, 4 can be smaller than that of the clamping areas 1, 5 or of the bearing seat area 3. This is necessary so that the links 7, 8, 14, 15 do not collide with an optional spacer sleeve during deflection.

Figure 7:
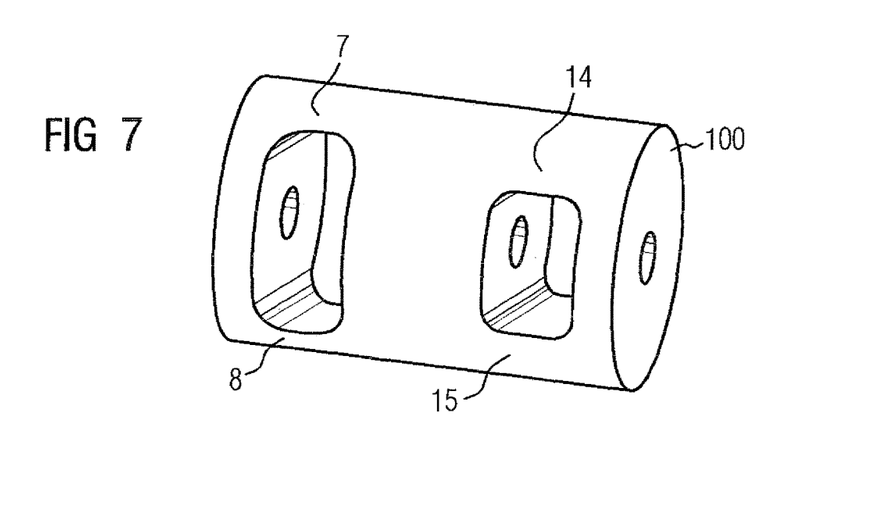
FIG. 7 shows a perspective view of a planetary axle clamped on two sides with a double wishbone mechanism having differently embodied links.

FIG. 7 shows a perspective view of a planetary axle clamped on two sides with a double wishbone mechanism with differently embodied links 7, 8, 14, 15.

Figure 8:
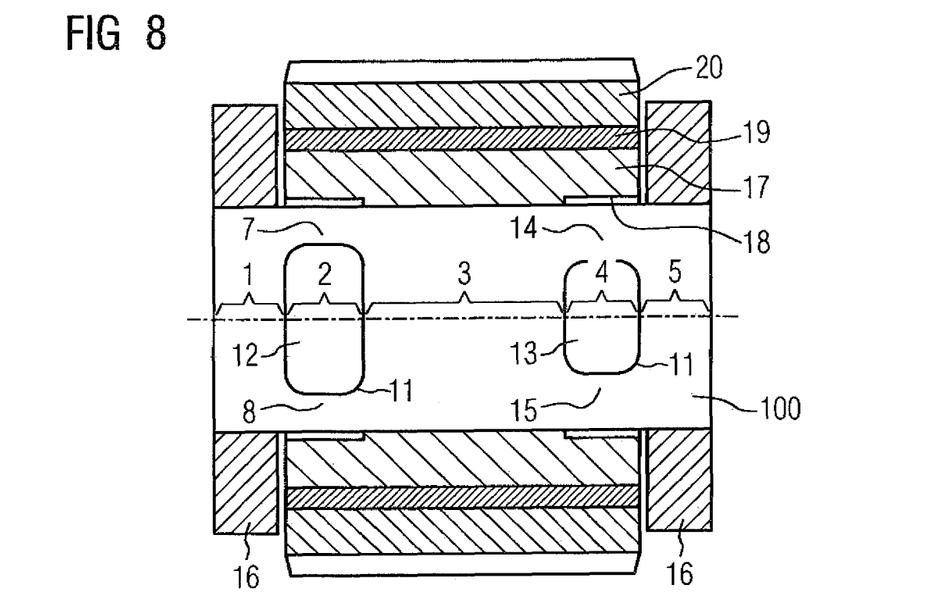
FIG. 8 shows a first embodiment of a planetary bearing with a double wishbone.

FIG. 8 shows a first embodiment of a planetary wheel slide bearing with double wishbone and spacer sleeve 17. A planetary axle 100 is clamped with its clamping areas 1, 5 placed at the ends of the planetary axle 100 in two planetary carrier sides 16. The area of the planetary axle 100 which is disposed freely therebetween is divided into an axially central bearing seat area 3 and two link areas 2, 4 disposed in each case between the bearing seat area 3 and the clamping areas 1, 5. In such cases the link areas 2, 4 each have a through opening 12, 13 which runs at right angles in relation to the planetary axle. The two through openings 12, 13 have different cross-sections, so that the links 7, 8, 14, 15 likewise have different widths at two through openings 12, 13, i.e. the webs of the planetary axle 100 remaining in the link areas 2, 4. Section A-A is shown in FIG. 6. By varying the lengths and cross-sections of the through openings 12, 13 and correspondingly the links 7, 8, 14, 15, the rigidity and thus the type of clamping of the planetary axle 100 can be varied.

A spacer sleeve 17 which is in turn surrounded by a slide bearing sleeve 19 and a planetary wheel 20 rests on the planetary axle 100 between the planetary carrier sides 16. In such cases the spacer sleeve 17 has an undercut 18 at each end of the inner diameter in each case, so that the spacer sleeve 17 in the link areas 2, 4 does not touch the planetary axle 100. In this way the spacer sleeve 17 touches the planetary axle 100 only in the central bearing seat area 3, while in the adjacent link areas 2, 4 the spacer sleeve 17 is at a radial distance from the planetary axle 100. The radial distance in the area of the link areas 2, 4 serves to permit the planetary axle 100 a radial displacement or deformation in the link areas 2, 4.

Figure 9:
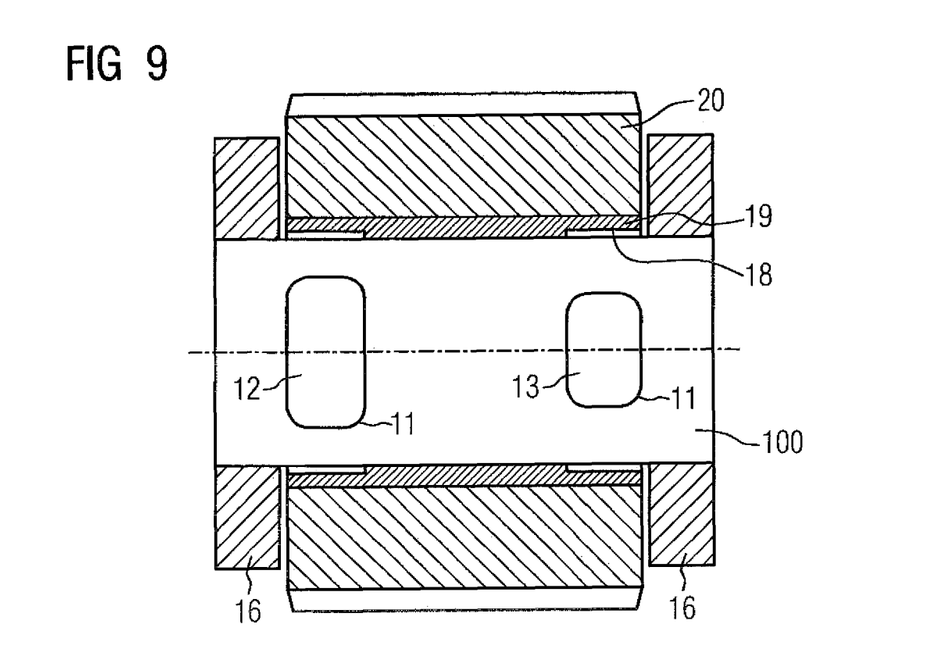
FIG. 9 shows a further embodiment of a planetary bearing with a double wishbone.

FIG. 9 shows a first embodiment of a planetary wheel slide bearing with double wishbone and without spacer sleeve. The embodiment shown in FIG. 9 corresponds largely to the embodiment shown in FIG. 8, with the difference that the embodiment shown in FIG. 9 is embodied without a spacer sleeve 17. Instead, the slide bearing sleeve 19 rests directly on the planetary axle 100. Similarly to the embodiment shown in FIG. 8, the slide bearing sleeve 19 has an undercut 18 at each end on its inner diameter in each case so that in the link areas 2, 4 the slide bearing sleeve 19 does not touch the planetary axle 100.

Figure 10:
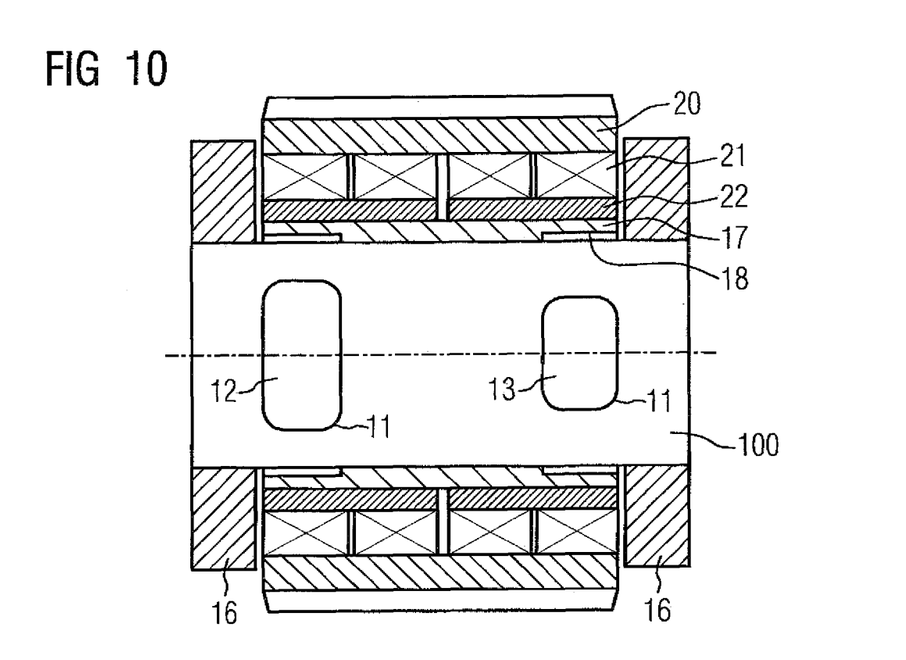
FIG. 10 shows a further embodiment of a planetary bearing with a double wishbone.

FIG. 10 shows an embodiment of a planetary wheel roller bearing with a double wishbone and a spacer sleeve. The embodiment shown in FIG. 10 corresponds largely to the embodiment shown in FIG. 8, with the difference that the embodiment shown in FIG. 10 has a bearing inner ring 22 and a roller bearing 21 instead of the slide bearing sleeve 19.

Figure 11:
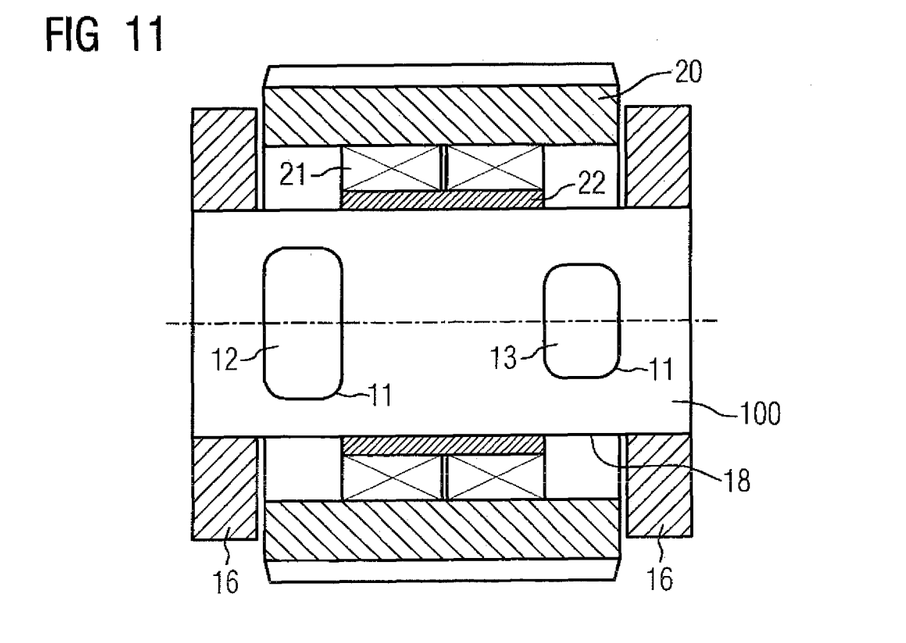
FIG. 11 shows a further embodiment of a planetary bearing with a double wishbone.

FIG. 11 shows an embodiment of a planetary wheel roller bearing with a double wishbone and without a spacer sleeve. The embodiment shown in FIG. 11 corresponds largely to the embodiment shown in FIG. 10, with the difference that the embodiment shown in FIG. 11 is embodied without a spacer sleeve 17. Instead, the bearing inner rings 22 rest directly on the planetary axle 100. The bearing inner rings 22 and the roller bearing 21 surrounding the bearing inner rings 22 are however arranged exclusively in the central bearing seat area 3. The radial displacement or deformation of the planetary axle 100 in the link areas 2, 4 is negligible compared with the clearance between the planetary axle 100 and the planetary wheel 20 resulting therefrom.

Figure 12:
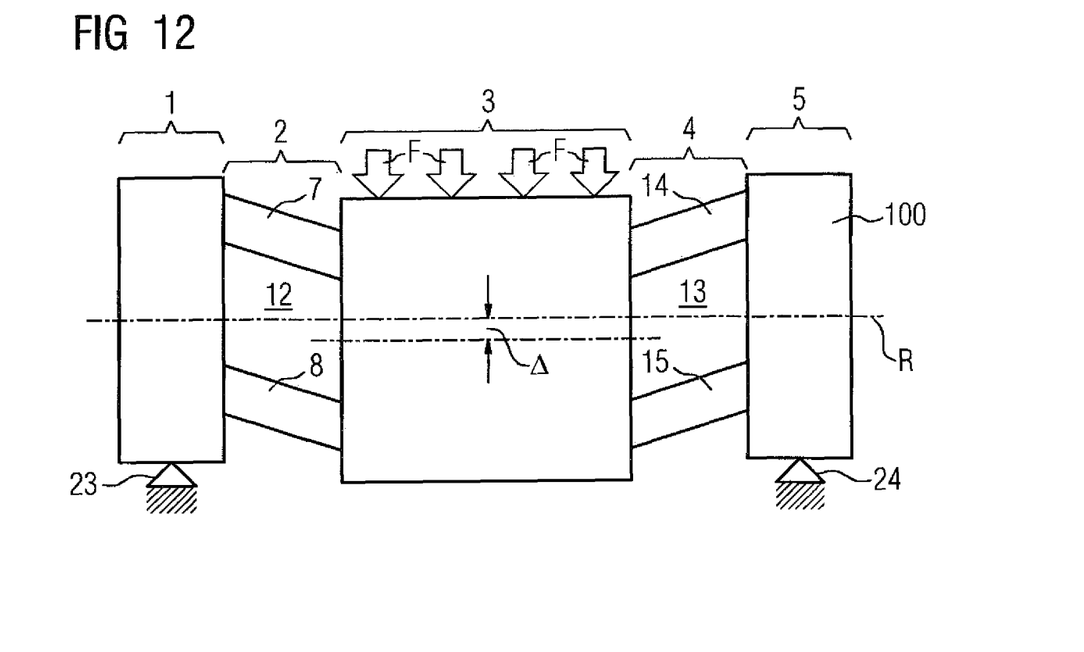
FIG. 12 shows a spring deflection of a planetary axle with a double wishbone mechanism with a coaxial support.

FIG. 12 shows a schematic representation of the spring deflection of the planetary axle 100 which is reflected in a position change A in the bearing seat area 3 of the planetary axle 100 under load F in the case of coaxially embodied supports 23, 24. The planetary axle system compresses symmetrically here. The roller bearing seat deflects horizontally by the path length difference A.

Figure 13:
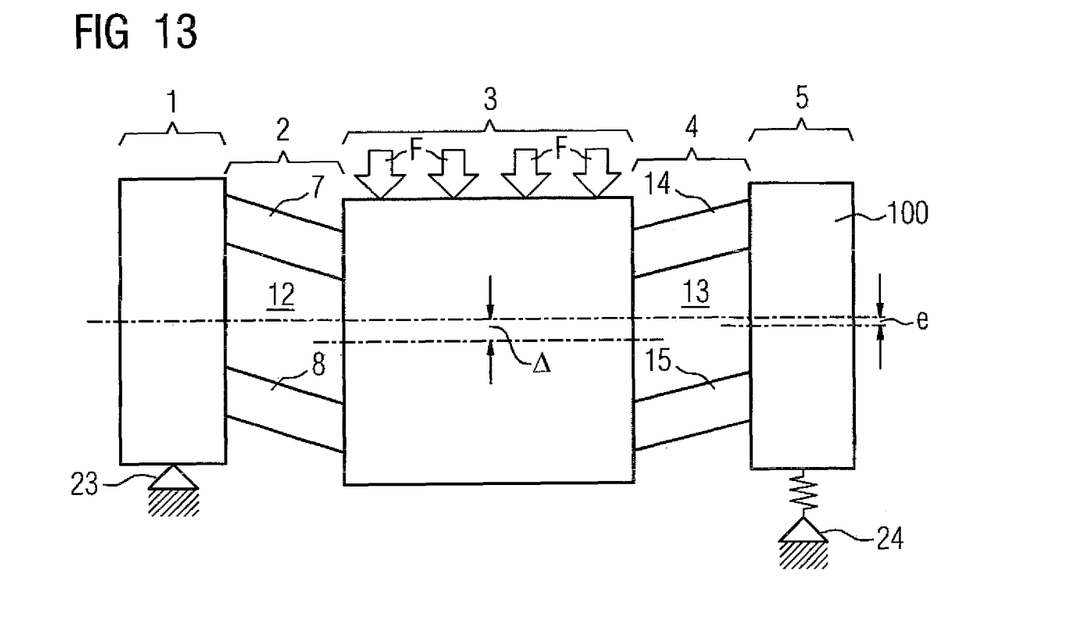
FIG. 13 shows a spring deflection of a planetary axle with a double wishbone mechanism with eccentric alignment of the support.

FIG. 13 shows in simplified form the deflection of the planetary axle 100 for the case of eccentrically positioned supports 23, 24, e.g. in the case of a twisted planetary carrier. The soft transverse flexural links 7, 8, 14, 15 can compensate for the relative displacement e in the support 24, the bearing seat likewise remains horizontal. This applies if the clamping areas 1, 5 of the planetary axle 100 are rigidly clamped. Different response forces develop in the clamping depending on the flexural stiffness/shearing strength of the links. If the clamping areas 1, 5 are not clamped rigidly, then the flexural stiffness/shearing strength of the right link 14, 15 with respect to that of the left 7, 8 is to be adjusted to the desired translational deflection. The response force in the clamping points 1, 5 is almost the same in this case.

Figure 14:
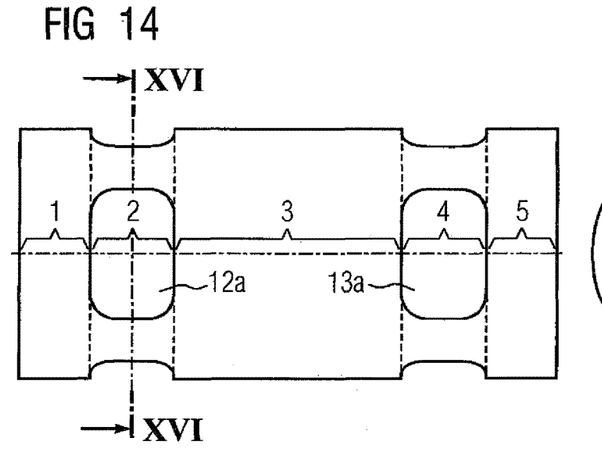
FIG. 14 shows a front view of a planetary axle clamped on two sides having a multi-link mechanism.
Figure 15:
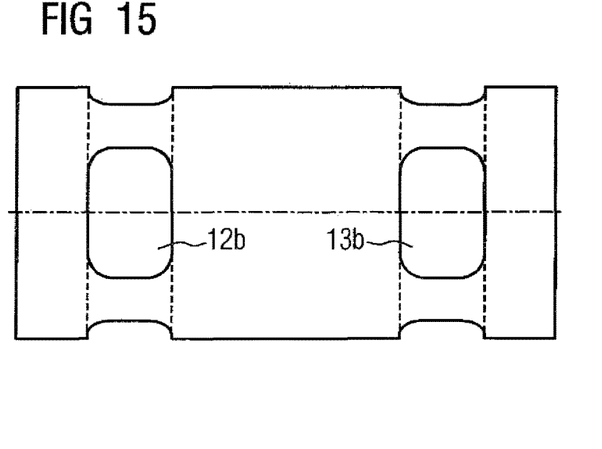
FIG. 15 shows a top view of the planetary axle of FIG. 14.
Figure 16:
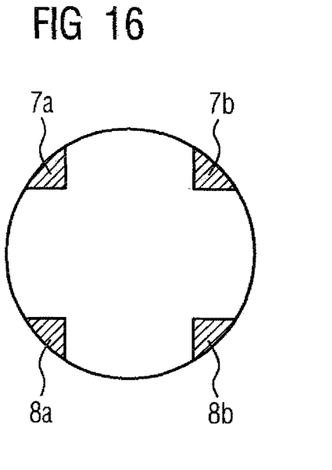
FIG. 16 shows a sectional view of the planetary axle, taken along the line XVI-XVI in FIG. 14.

FIGS. 14 to 16 show a two-sided clamped axle with an expanded double wishbone mechanism: If a further through opening 12*b*, 13*b* is added to the planetary axle 100 in the transverse link areas 2, 4 perpendicular to the first through openings 12*a*, 13*a*, likewise at right angles to the axle, a multi-link variant is achieved. The planetary axle 100 now has the feature of being able to carry out a directional elastic deformation in a further plane. In this expanded embodiment of the transverse link planetary wheel suspension, axial inclination errors in addition to axial deviation errors can be compensated.

Figure 17:
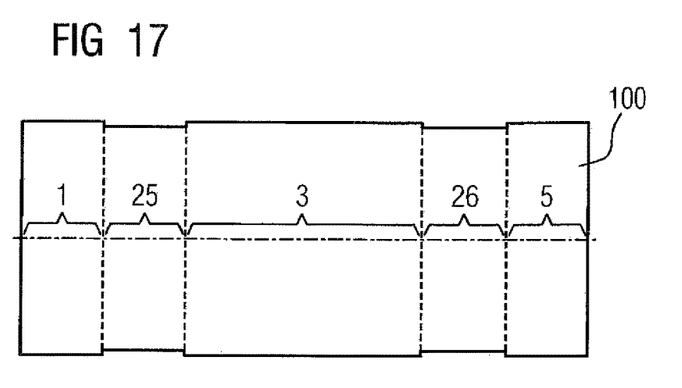
FIG. 17 shows a front view of a planetary axle clamped on two sides having a thrust/flexural link mechanism.
Figure 18:
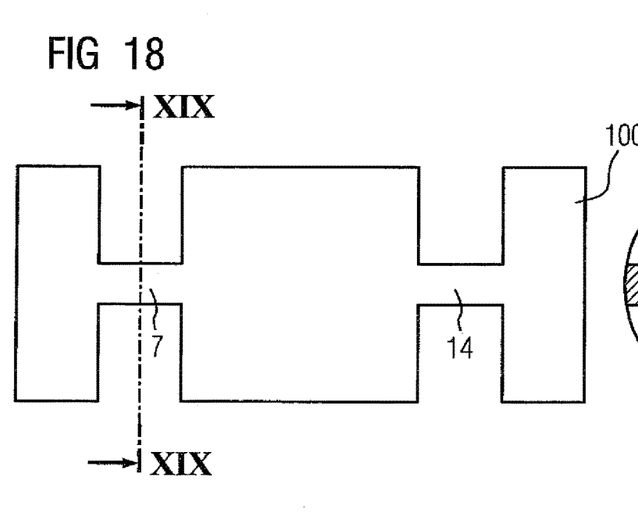
FIG. 18 shows a top view of the planetary axle of FIG. 17.
Figure 19:
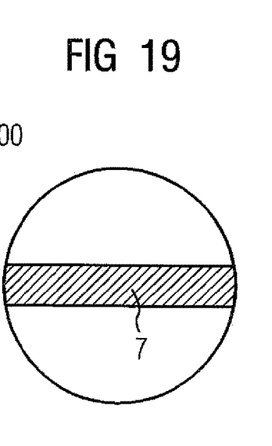
FIG. 19 shows a sectional view of the planetary axle, taken along the line XIX-XIX in FIG. 17.

FIGS. 17 to 19 show a two-sided clamped planetary axle with a simple thrust/flexural link mechanism. The planetary axle 100 has a first area 1 at a first end for supporting/clamping in the planetary carrier, adjacent thereto a first thrust/flexural link 25, adjacent thereto a bearing seat area 3 for receiving the gear wheel with an associated bearing mechanism, adjacent thereto a second thrust/flexural link 26 and adjacent thereto at another end a second area 5 for supporting/clamping in the planetary carrier.

The thinner the bars, i.e. the first and second thrust/flexural links 25, 26, the lower the twisting strength. The relative twisting of the two planetary carrier sides in relation to one another also carries out a relative twisting of the two opposing planetary axle bore holes. This relative twisting of the axle supports can thus be elastically compensated by the planetary axle 100 and thus creep between axle and planetary axle bore hole can be avoided.

Figure 20:
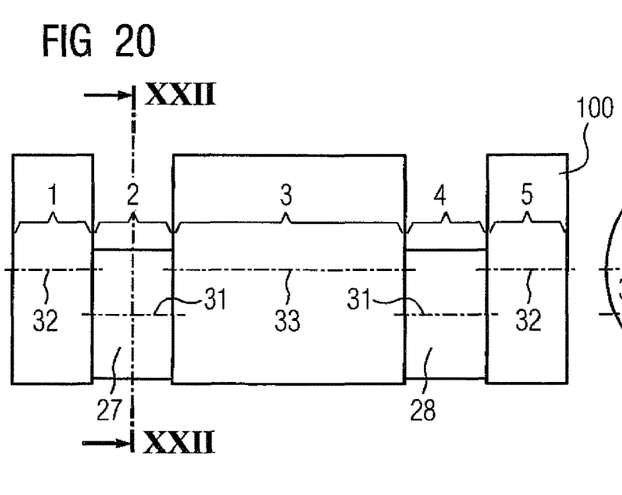
FIG. 20 shows a front view of a planetary axle clamped on two sides with a longitudinal link mechanism.
Figure 21:
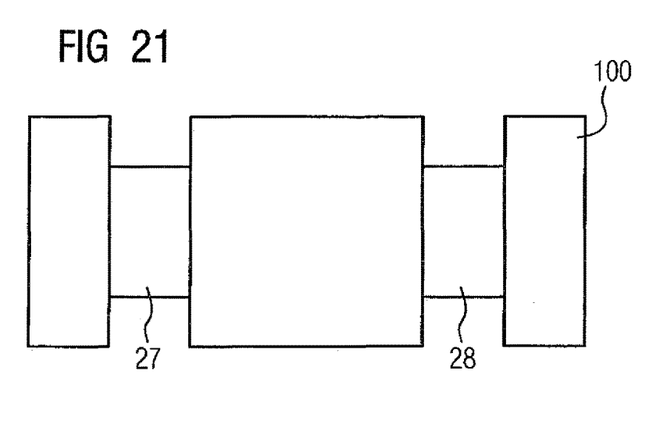
FIG. 21 shows a top view of the planetary axle of FIG. 20.
Figure 22:
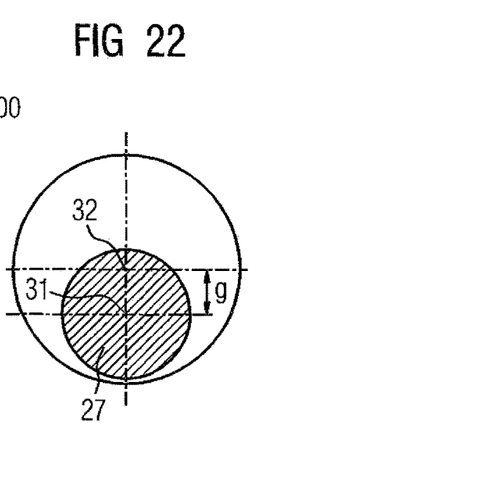
FIG. 22 shows a sectional view of the planetary axle, taken along the line XXII-XXII in FIG. 20.

FIGS. 20 to 22 show a design of a longitudinal link axle. The planetary axle 100 points to a first area 1 at a first end for supporting/clamping in the planetary carrier, adjacent thereto a first longitudinal link area 2 with an eccentrically disposed profile 27, adjacent thereto a bearing seat area 3 for receiving the toothed gear wheel with an associated bearing mechanism, adjacent thereto a second longitudinal link area 4 with an eccentrically disposed profile 28, and adjacent thereto at another end a second area 5 for supporting/clamping in the planetary carrier. In the embodiment shown the centroidal axis 31 of the link areas 27, 28 is disposed approximately in the area of the central axis of the eccentrically disposed profiles 27, 28. The centroidal axis 32 of the clamping areas 1, 5 is disposed approximately in the area of the central axis of the planetary axle 100, similarly to the centroidal axis 33 of the bearing seat area 3.

An axle 100 for supporting gear wheels has a clamping area 1, 5 at both ends for fixing in a two-sided frame, i.e. the planetary carrier, a central area 3 with the bearing seat and in each case a longitudinal link area 2 and 4 between the clamping area 1, 5 and bearing seat area 3. The longitudinal link axle is characterized in that in each case the bearing seat area 3 and the clamping area 1, 5 are connected by a link area 2, 5 with any profile, the centroidal axis 31 of which is disposed eccentrically in relation to the centroidal axis 33 of the bearing area 3. The bearing seat area 3 can now carry out an elastic rotational movement about the centroidal axis 31 of the link areas 2, 4 on a circular path, the radius of which corresponds to the distance g of the axes through the center of gravity 31, 33. In principle it is also possible to omit the clamping areas 1 and 5 and to fix the cam profiles 27, 28 arbitrarily directly in the planetary carrier.

Figure 23:
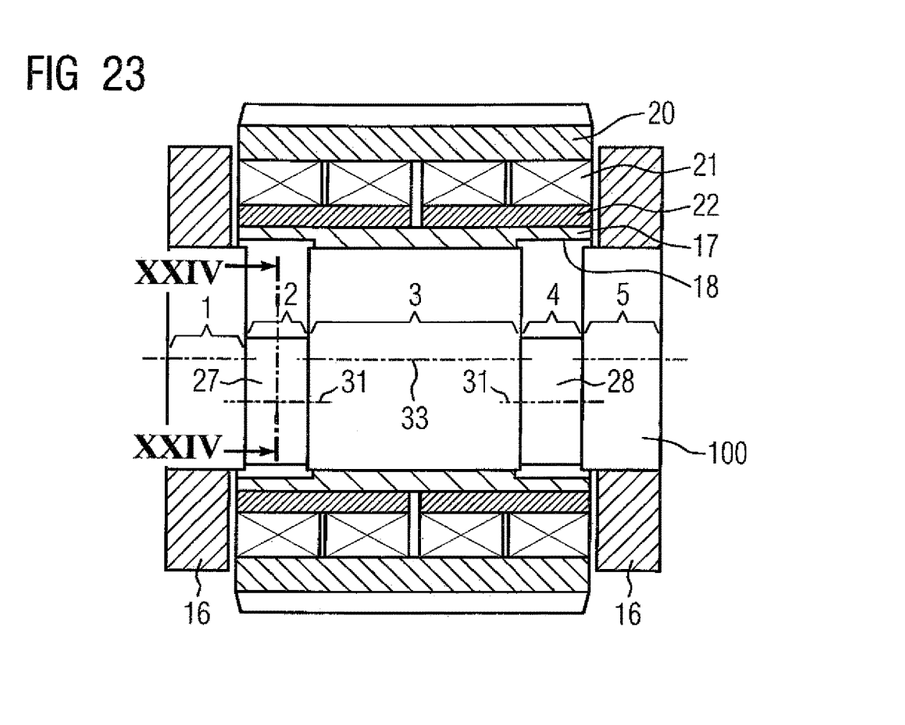
FIG. 23 shows an embodiment of a roller-supported planetary bearing with a longitudinal link without a spacer sleeve.
Figure 24:
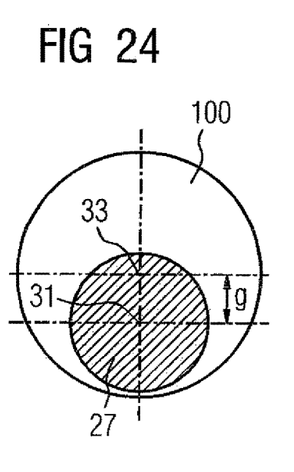
FIG. 24 shows a sectional view of the longitudinal link, taken along the line XXIV-XXIV in FIG. 23.

FIGS. 23 and 24 show an embodiment of a roller-supported planetary support with a longitudinal link and spacer sleeve 17. A planetary axle 100 is clamped with its clamping areas 1, 5 placed at the ends of the planetary axle 100 in two planetary carrier sides 16. The area of the planetary axle 100 which is disposed freely therebetween is divided into an axially central bearing seat area 3 and two link areas 2, 4 disposed in each case between the bearing seat area 3 and the clamping areas 1, 5. In such cases the link areas 2, 4 each have a profile 27, 28 arranged eccentrically in respect of the centroidal axis 33 of the bearing seat area 3. The offset g provides the distance between the centroidal axis 33 of the bearing seat area 3 and the centroidal axis 31 of the link areas 2, 4. The section A-A of the first profile 27 is shown in FIG. 24.

By varying the profiles 27, 28, the rigidity and thus the type of clamping of the planetary axle 100 can be varied.

A spacer sleeve 17, which is in turn surrounded by bearing inner rings 22, roller bearings 21 and a planetary wheel 20, rests in the bearing seat area 3 between the planetary carrier sides 16. In such cases the spacer sleeve 17 has an undercut 18 at each end of its inner diameter in each case, so that the spacer sleeve 17 in the link areas 2, 4 does not touch the planetary axle 100, more precisely the eccentric profiles 27, 28. In this way the spacer sleeve 17 touches the planetary axle 100 only in the central bearing seat area 3, while in the adjacent link areas 2, 4 the spacer sleeve 17 is at a radial distance from the planetary axle 100. The radial distance in the area of the link areas 2, 4 serves to allow the planetary axle 100 a radial displacement or deformation into the link areas 2, 4.

The longitudinal link variant, analogously to the aforedescribed transverse link variants, can also be embodied without a spacer sleeve 17, alternatively slide-supported with and without a spacer sleeve 17.

Figure 25:
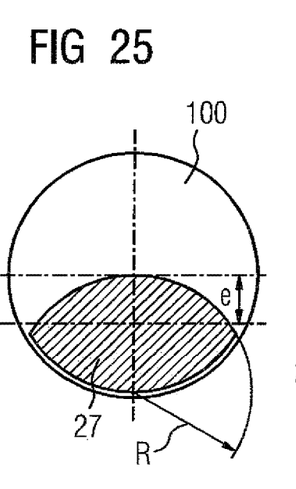
FIG. 25 shows a sectional view through a further embodiment of a longitudinal link profile.
Figure 26:
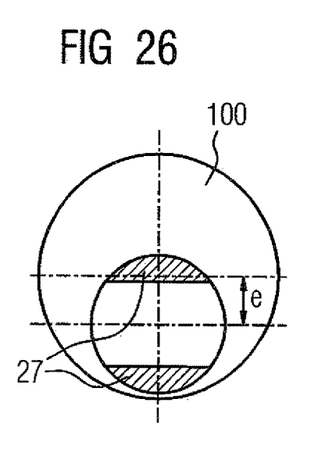
FIG. 26 shows a sectional view through a further embodiment of a longitudinal link profile.

FIGS. 25 and 26 each show a section through a further embodiment of a longitudinal link profile 27, which is embodied in the link areas 2, 4 of a planetary axle. In such cases the profile 27 shown in FIG. 25 is a longitudinal link profile, whereas the profile 27 shown in FIG. 26 is a double transverse longitudinal link profile.

Figure 27:
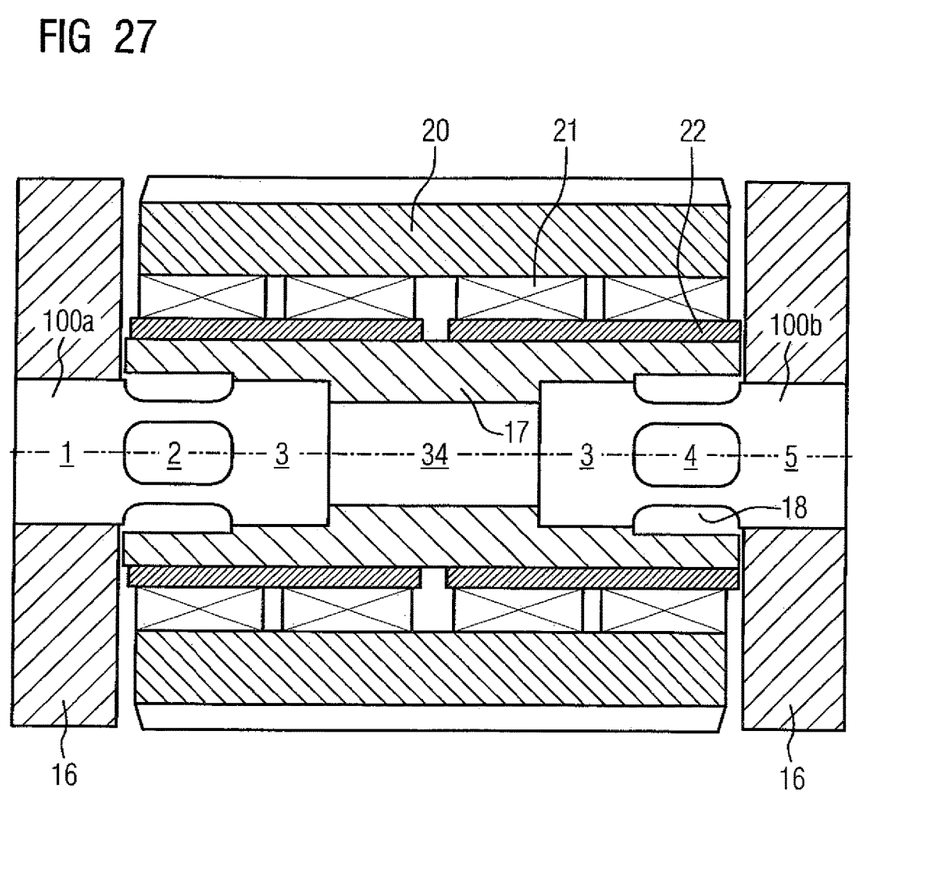
FIG. 27 shows a sectional view through an embodiment of a divided longitudinal link profile.

FIG. 27 shows a section through am embodiment of a divided link profile. In conjunction with a spacer sleeve 17 and a two-sided planetary carrier, a divided design can be carried out for transverse and for longitudinal links with two simple links. The embodiment largely follows the embodiment according to FIG. 10, however with the differences that the link profiles in the link areas 2 and 4 are embodied according to FIG. 16 and that the bearing seat area 3 with bearing seat is interrupted by a clearance 34; in other words: the planetary axle 100 consists of two halves, which do not touch one another axially. This design can also be regarded as two separate planetary axles 100a, 100b with single links 2, 4.

Figure 28:
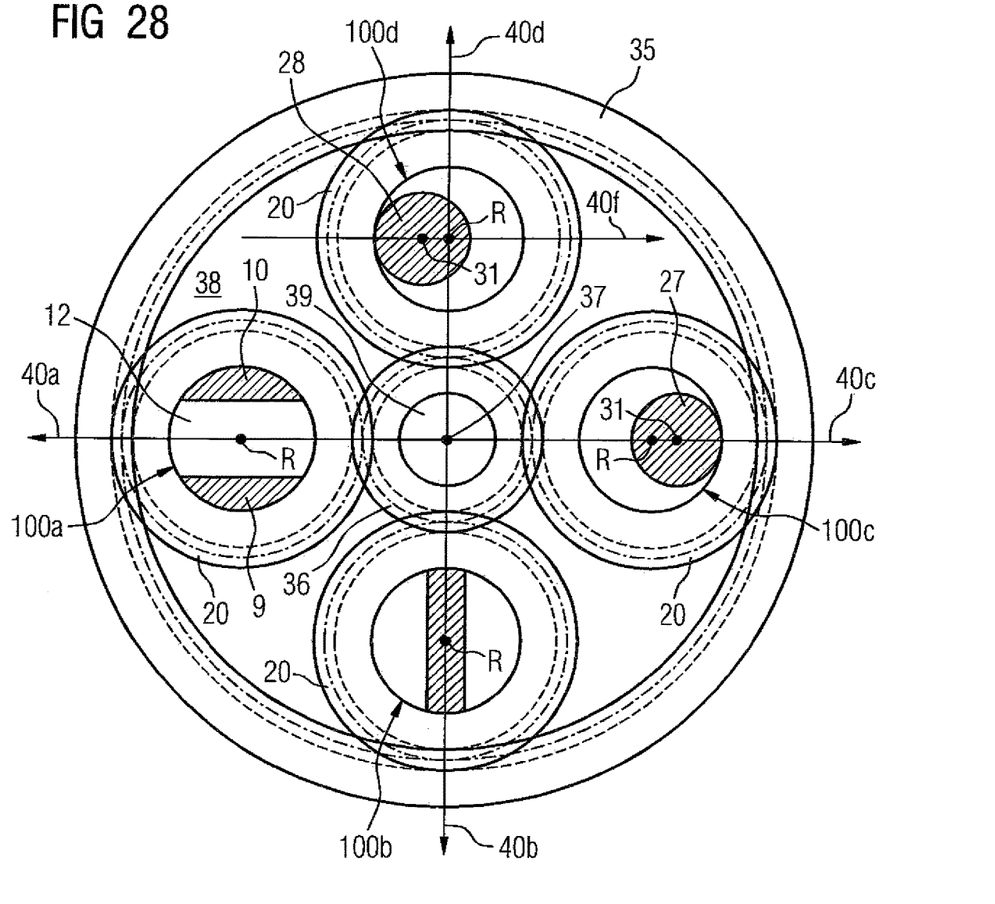
FIG. 28 shows a cross-section through link areas of planetary axles.

FIG. 28 serves to illustrate an advantageous orientation of the profiles arranged in the link area with respect to the overall planetary gearbox stage system. FIG. 28 shows a cross-section through link areas 2 of planetary axles 100a, 110b, 110c, and 100d of a planetary gearbox stage with a stationary hollow wheel 35, a rotatably supported sun wheel 36, four rotatably supported planetary wheels 20 with central axes R and a rotatably supported planetary carrier with a planetary carrier side 38, viewed in the direction along the central axis of rotation 37 of the planetary carrier. The four planetary axles 100a, 100b, 100c, 100d, on which the planetary wheels 20 are rotatably supported, are clamped in the planetary carrier side 38 at right angles thereto and distributed equally over the periphery. The teeth of the planetary wheels 30 mesh with the hollow wheel 35 surrounding the planetary carrier 38. The sun wheel 36 which likewise meshes with the planetary wheels 20 is arranged in the axial center 37 of the planetary carrier. The sun wheel rests in a torsion-resistant manner on a sun wheel shaft 39, which is supported rotatably about the axis of rotation 37. This design produces a rotation of the planetary support side 38 about its axis of rotation 37 in relation to a quicker rotation of the sun wheel shaft 39.

A first planetary axle 100a is embodied analogously to a transverse link axle, having a cross-section in the link area as shown in FIG. 6. In such cases the through opening 12 runs at right angles to the circular movement of the planetary axle 100a about the axis of rotation 37 of the planetary carrier; correspondingly thereto the two transverse link arms 9, 10 of the link area run in parallel to a radial line 40a, which begins at the axis of rotation 37 of the planetary carrier and runs through the central axis R of the planetary axle 100a.

A second planetary axle 100b is embodied analogously to a thrust/flexural link axle, with a cross-section in the link area as shown in FIG. 19. In such cases the bar 25 of the link area runs along a radial line 40b, which begins at the axis of rotation 37 of the planetary carrier and runs through the central axis R of the planetary axle 100b.

A third planetary axle 100c is embodied analogously to a longitudinal link axle, having a cross-section in the link area as shown in FIG. 22. In such cases the centroidal axis 31 of the eccentrically arranged profile 27 along a radial line 40c, which begins at the axis of rotation 37 of the planetary carrier and runs through the central axis R of the planetary axle 100c, is offset by a distance g compared with the centroidal axis 33 in the direction of the line.

The centroidal axis 31 of the link area 2 is therefore embodied eccentrically with respect to the central axis R of the planetary axle 100 such that a plane spanned by the centroidal axis 31 and central axis R runs at right angles to the circular path of the planet.

A fourth planetary axle 100d is embodied analogously to a longitudinal link axle, having a cross-section in the link area as shown in FIG. 22. In such cases the centroidal axis 31 of the eccentrically arranged profile 28 is transverse to a radial line 40d, which begins at the axis of rotation 37 of the planetary carrier and runs through the central axis R of the planetary axle 100d, offset by a distance g compared with the centroidal axis 33, namely counter to the direction of a line 40f, which runs parallel to the radial line 40c and through the central axis R of the planetary axle 100d.

The centroidal axis 31 of the link area 2 is embodied eccentrically in relation to the central axis R of the planetary axle 100 such that a plane spanned by an centroidal axis 31 and central axis R runs tangentially in relation to the circular path of the planet.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A planetary axle for a planetary gearbox for use in the automotive industry, said planetary axle comprising:
   a clamping area for clamping of the planetary axle in a side of a planetary carrier;
   a bearing seat area for receiving a planetary bearing; and
   a link area disposed between the clamping area and the bearing seat area,
   wherein the planetary axle is embodied analogously to a transverse link axle and defines a central axis, said link area including at least one through opening which extends at a right angle to the central axis, and at least two transverse link arms which connect the clamping area and the bearing seat area.

2. A planetary axle for a planetary gearbox for use in the automotive industry, said planetary axle comprising:

a clamping area for clamping of the planetary axle in a side of a planetary carrier;

a bearing seat area for receiving a planetary bearing; and a link area disposed between the clamping area and the bearing seat area, wherein the planetary axle is embodied analogously to a longitudinal link axle, said link area defining a centroidal axis which extends eccentrically with respect to a centroidal axis of the bearing seat area and/or to a centroidal axis of the clamping area.

3. A planetary gearbox stage, comprising a planetary axle for use in the automotive industry, said planetary axle comprising a clamping area for clamping of the planetary axle in a side of a planetary carrier, a bearing seat area for receiving a planetary bearing, and a link area disposed between the clamping area and the bearing seat area, wherein the planetary axle is embodied analogously to a transverse link axle and defines a central axis, said link area including at least one through opening which extends at a right angle to the central axis, and at least two transverse link arms which connect the clamping area and the bearing seat area.

4. The planetary gearbox stage of claim 3, wherein the through opening is aligned at a right angle to a circular path of the planetary axle.

5. A planetary gearbox stage, comprising a planetary axle for use in the automotive industry, said planetary axle comprising a clamping area for clamping of the planetary axle in a side of a planetary carrier, a bearing seat area for receiving a planetary bearing, and a link area disposed between the clamping area and the bearing seat area, wherein the planetary axle is embodied analogously to a longitudinal link axle, said link area defining a centroidal axis which extends eccentrically with respect to a centroidal axis of the bearing seat area and/or to a centroidal axis of the clamping area.

6. The planetary gearbox stage of claim 5, wherein the centroidal axis of the link area is embodied eccentrically with respect to a central axis of the planetary axle and spans together with the central axis a plane of random alignment.

7. The planetary gearbox stage of claim 6, wherein the plane is aligned tangentially or at a right angle with respect to a circular path of a planet.

* * * * *